United States Patent [19]

McCormick et al.

[11] Patent Number: 4,992,506

[45] Date of Patent: Feb. 12, 1991

[54] COPOLYETHERESTER ELASTOMERIC COMPOSITIONS

[75] Inventors: Michael R. McCormick, Mt. Vernon, Ind.; Thomas A. Morelli, Pittsfield, Mass.; Warren J. Peascoe, West Stockbridge, Mass.; Stefan F. Rasch, Cheshire, Mass.; John A. Tyrell, Dalton, Mass.; May T. Wong, Torrance, Calif.

[73] Assignee: General Electric Company, Pittsfield, Mass.

[21] Appl. No.: 279,351

[22] Filed: Dec. 2, 1988

[51] Int. Cl.$^5$ .................. C08L 67/02; C08K 3/10
[52] U.S. Cl. ..................... 524/513; 524/504; 525/64; 525/166; 525/173; 525/174; 525/176; 525/903
[58] Field of Search ............... 525/64, 173, 174, 176, 525/903, 166; 524/504, 513

[56] References Cited

U.S. PATENT DOCUMENTS

| | | |
|---|---|---|
| 3,907,926 | 9/1975 | Brown et al. |
| 3,944,631 | 3/1976 | Yu ........................ 525/308 |
| 4,212,791 | 7/1980 | Avery .................... 525/174 |
| 4,342,846 | 8/1982 | Silberberg ............. 525/176 |
| 4,469,851 | 9/1984 | Charles et al. ........ 525/444 |
| 4,579,884 | 4/1986 | Liu ....................... 525/444 |
| 4,778,855 | 10/1988 | Boutni ................. 525/444 |
| 4,831,082 | 5/1989 | Peascoe ............... 525/903 |

FOREIGN PATENT DOCUMENTS

| | | | |
|---|---|---|---|
| 237306 | 9/1987 | European Pat. Off. | 525/64 |
| 036249 | 3/1980 | Japan | 525/173 |
| 102946 | 6/1982 | Japan | 525/64 |
| 1431916 | 4/1976 | United Kingdom . | |

Primary Examiner—John C. Bleutge
Assistant Examiner—David Buttner
Attorney, Agent, or Firm—Hedman, Gibson, Costigan & Hoare

[57] ABSTRACT

Molding compositions comprise a copolyetherester (A), (B) an aromatic thermoplastic polyester and a multistage rubbery elastomer (C) comprising a crosslinked (meth)acrylate phase and an interpenetrating, crosslinked styrenic phase and optionally, a mineral filler (D). Such compositions are useful for making molded articles with a good balance of modulus and elongation properties.

21 Claims, No Drawings

COPOLYETHERESTER ELASTOMERIC COMPOSITIONS

CROSS-REFERENCE TO RELATED APPLICATION

This application is related to the following commonly owned related applications:

| Ser. No. | Filed | Title | Applicants |
| --- | --- | --- | --- |
| 152,524 | 2/5/88 | Polyetherimide Ester Elastomeric Compositions | W. J. Peascoe J. A. Tyrell |
| 07/279,353 | concurrently | Copolyetherester Elastomeric Compositions | T. A. Morelli W. J. Peascoe S. F. Rasch J. A. Tyrell |
| 07/279,352 | concurrently | Polyetherimide Ester Elastomeric Compositions | W. J. Peascoe J. A. Tyrell |

COPOLYETHERESTER MOLDING COMPOSITIONS

Field of Invention

The present invention relates to novel thermoplastic elastomeric molding compositions. Specifically, the compositions of the instant invention comprises one or more copolyetheresters (A), in random or block form, an aromatic thermoplastic polyester (B) a multistage elastomer comprised of a crosslinked alkyl acrylate phase which is interpenetrated by a crosslinked styrenic phase (C) and optionally, a mineral filler (D). The compositions provide molded articles which exhibit improved physical properties, such as good tensile elongation.

BACKGROUND

Copolyetheresters are well known and have enjoyed continued and increasing commercial success. They are available from several sources including the Hytrel ® resins from E. I. duPont and the RITEFLEX resins from Celanese (formerly GAFLEX resins from GAF) and are described in U.S. Pat. Nos. 3,023,192; 3,651,014; 3,763,109; 3,766,146; 3,784,520; 3,801,547; 4,156,774; 4,264,761 and 4,355,155, among others. These copolyetheresters have a number of desirable properties including excellent tear strength, flex life, toughness, and general elastomeric stress-strain characteristics.

Dependent upon the application, there are various modulus and durometer requirements. To some extent these properties can be varied by the constituents of the polyetherester, but such "custom" synthesis can be costly and impractical when a wide range is required.

It has now been surprisingly found that effective amounts of the aforementioned multistage polymer modifier can be combined with a copolyetherester and a thermoplastic polyester and optionally a mineral filler thereupon obtaining moldable compositions exhibiting good modulus and tensile properties.

It is an object of the present invention to provide thermoplastic molding compositions which are suitable for a broad range of end use applications and providing molded parts with good physical integrity and stiffness.

SUMMARY OF THE INVENTION

In accordance with the present invention there are provided improved thermoplastic elastomeric compositions having good flexural modulus and, more importantly, better softness (lower modulus), while retaining good elongation properties as compared to unmodified copolyetheresters, the compositions comprising:

(A) one or more thermoplastic copolyetheresters,
(B) one or more aromatic thermoplastic polyesters,
(C) a modulus reducing amount of a rubbery interpolymer comprising a crosslinked (meth)acrylate rubbery phase and an interpenetrating, crosslinked styrenic resin phase, and optionally
(D) a mineral filler.

The amount can vary broadly. However, preferred compositions are those wherein the copolyetherester (A) is present in an amount of from about 1 to 99 parts by weight to, correspondingly, from about 99 to about 1 parts by weight of aromatic polyester (B) and the rubbery interpolymer (C) is present in an amount of from about 5 to 95 parts by weight to, correspondingly from about 95 to 5 parts of (A) and (B) taken together and mineral filler (D) is present in an amount of from 0 to 80 parts by weight per 100 parts by weight of (A), (B), and (C), taken together More preferably, the compositions are those comprising from about 20 to 80 parts by weight of copolyetherester elastomer (A) to from about 80 to 20 parts by weight aromatic polyester (B), and from about 5 to about 95 parts by weight of rubbery interpolymer (C) based on about 95 to about 5 parts by weight of (A) and (B) taken together, and from about 0 to about 40 parts by weight of mineral filler (D).

DETAILED DESCRIPTION OF THE INVENTION

Suitable thermoplastic copolyetheresters (A) include both random and block copolymers. In general these are prepared by conventional esterification/polycondensation processes from (i) one or more diols, (ii) one or more dicarboxylic acids, (iii) one or more long chain ether glycols, and, optionally, (iv) one or more lactones or polylactones.

Diols(i) which can be used in the preparation of the copolyetheresters include both saturated and unsaturated aliphatic and cycloaliphatic dihydroxy compounds as well as aromatic dihydroxy compounds. These diols are preferably of a low molecular weight, i.e., having a molecular weight of about 300 or less.

When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from about 2 to 19 carbon atoms Exemplary of these diols there may be given ethylene glycol; propanediol; butanediol; pentanediol; 2-methyl propanediol; 2,2-dimethyl propanediol; hexanediol; decanediol; 2-octyl undecanediol; 1,2-, 1,3- and 1,4-dihydroxy cyclohexane; 1,2-, 1,3-, and 1,4-cyclohexane dimethanol; butenediol; hexenediol; etc. Especially preferred are 1,4-butanediol and mixtures thereof with hexanediol or butenediol.

Aromatic diols suitable for use in the preparation of the thermoplastic elastomers are generally those having from 6 to about 20 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl) propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole percent, most preferably at least 80 mole percent, based on the total diol content, be the same diol. As mentioned above, the preferred thermoplastic elastomers are those in which 1,4-butanediol is present in a predominant amount.

Dicarboxylic acids (ii) which are suitable for use in the preparation of the copolyetheresters include aliphatic, cycloaliphatic, and/or aromatic dicarboxylic acids. These acids are preferably of a low molecular weight, i.e., having a molecular weight of less than about 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. Additionally, the dicarboxylic acids may contain any substituent group(s) or combinations which do not substantially interfere with the polymer formation and use of the polymer in the practice of this invention.

Aliphatic dicarboxylic acids, as the term is used herein refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring where more than one ring is present, they can be joined by aliphatic or aromatic divalent radicals or divalent radicals such as —O— or —SO$_2$—.

Representative aliphatic and cycloaliphatic acids which can be used are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2- dicarboxylic acid, 2-ethylsuberic acid, tetramethylsuccinic acid, cyclopentane dicarboxlic acid, decahydro-1,5-naphthalene dicarboxylic acid, 4,4'-bicyclohexyl dicarboxylic acid, decahydro2,6-naphthalene dicarboxylic acid, 4,4'-methylenebis(cyclohexane carboxylic acid), 3,4-furan dicarboxylic acid, and 1,1-cyclobutanedicarboxylic acid. Preferred aliphatic acids are cyclohexanedicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxybis(benzoic acid), ethylene 1-2 bis(p-oxybenzoic acid), 1,5-naphthalenedicarboxylic acid, 2,6-naphthalene dicarboxylic acid, 2,7-naphthalenedicarboxylic acid, phenanthrenedicarboxylic acid, anthracenedicarboxylic acid, 4,4'-sulfonyl dibenzoic acid, and halo and $C_1$–$C_{12}$ alkoxy, and aryl ring substitution derivatives thereof. Hydroxy acid such as p-(beta-hydroxyethoxy)benzoic acid can also be used provided an aromatic dicarboxylic acid is also present.

Preferred dicarboxylic acids for the preparation of the copolyetheresters are the aromatic dicarboxylic acids, mixtures thereof and mixtures of one or more dicarboxylic acid with an aliphatic and/or cycloaliphatic dicarboxy acid, most preferably the aromatic dicarboxylic acids. Among the aromatic acids, those with 8–16 carbon atoms are preferred, particularly the benzene dicarboxlic acids, i.e., phthalic, terephthalic and isophthalic acids and their dimethyl derivatives. Especially preferred is dimethyl terephthalate.

Finally, where mixtures of dicarboxylic acids are employed, it is preferred that at least about 60 mole percent, preferably at least about 80 mole percent, based on 100 mole percent of dicarboxylic acid (ii) be of the same dicarboxylic acid or ester derivative thereof. As mentioned above, the preferred copolyetheresters are those in which dimethyl terephthalate is the predominant dicarboxylic acid.

Suitable long chain ether glycols (iii) which can be used in the preparation of the thermoplastic elastomers are preferably poly(oxyalkylene)glycols and copoly(oxyalkylene)glycols of molecular weight of from about 400 to 12000. Preferred poly(oxyalkylene) units are derived from long chain ether glycols of from about 900 to about 4000 molecular weight and having a carbon-to-oxygen ratio of from about 1 8 to about 4.3, exclusive of any side chains.

Representative of suitable poly(oxyalkylene) glycols there may be given poly(ethylene ether)glycol; poly(propylene ether)glycol; poly(tetramethylene ether)glycol; random or block copolymers of ethylene oxide and propylene oxide, including ethylene oxide end capped poly(propylene ether) glycol and predominantly poly(ethylene ether) backbone, copoly(propylene etherethylene ether)glycol; and random or block copolymers of tetrahydrofuran with minor amounts of a second monomer such as ethylene oxide, propylene oxide, or methyltetrahydrofuran (used in proportions such that the carbon-to-oxygen ratio does not exceed about 4.3). Polyformal glycols prepared by reacting formaldehyde with diols such as 1,4-butanediol and 1,5-pentanediol are also useful. Especially preferred poly(oxyalkylene)-glycols are poly(propylene ether)-glycols, poly(tetramethylene ether)glycol and predominately poly(ethylene ether) backbone copoly(propylene ether-ethylene ether)-glycol.

Optionally, these copolyetheresters may have incorporated therein one or more lactones or polylactones (iv). Such lactone modified copolyetheresters are disclosed in copending U.S. patent application Ser. No. 643,985 filed Aug. 24, 1984.

Lactones (iv) suitable for use herein are widely available commercially, e.g., Union Carbide Corporation and Aldrich Chemicals. While epsilon caprolactone is especially preferred, it is also possible to use substituted lactones wherein the lactone is substituted by a lower alkyl group such as a methyl or ethyl group at the alpha, beta, gamma, delta, or epsilon positions. Additionally, it is possible to use polylactone, including homopolymers and copolymers thereof with one or more components, as well as hydroxy terminated polylactone, as block units in the novel copolyetheresters of the present invention. Suitable polylactones and processes for their production are described in, for example, U.S. Pat. Nos. 3,761,511; 3,767,627, and 3,806,495.

In general, suitable copolyetherester elastomers (A) are those in which the weight percent of (iii) long chain ether glycol component or the combined weight percent of (iii) long chain ether glycol component and (iv) lactone component in the copolyetherester is from about 5 to about 70 weight percent. Preferred composition are those wherein the weight percent of (iii) or (iii) and (iv) is from about 10 to about 50 weight percent. Where both (iii) long chain ether glycol and (iv) lactone are present, each will comprise from about 2 to about 50 percent by weight, preferably from about 5 to about 30 percent by weight, of the copolyetherester.

As described above, the copolyetheresters may be prepared by conventional esterification/condensation reactions for the production of polyesters. Exemplary of the processes that may be practiced are set forth in for example, U.S. Pat. Nos. 3,023,192; 3,763,109; 3,651,014; 3,663,653 and 3,801,547. Additionally, these compositions may be prepared by such processes and other known processes to effect random copolymers, block copolymers, or hybrids thereof wherein both random and block units are present. For example, it is possible that any two or more of the foregoing monomers/reactants may be prereacted prior to polymerization of the final copolyetheresters. Alternatively, a two part synthesis may be employed where in two different diols and/or dicarboxylic acids are each prereacted in separate reactors to form two low molecular weight prepolymers which are then combined with the long chain ether glycol to form the final tri-block copolyetherester. Further exemplification of various copolyetheresters will be set forth below in the examples.

The foregoing thermoplastic elastomers (A) are modified in accordance with the teachings of the instant invention by admixing therewith one or more thermoplastic aromatic polyesters (B) derived from an aliphatic and/or cycloaliphatic diol and an aromatic dicarboxylic acid or its ester derivatives and a rubbery, multistage interpolymer modifier (C). Optionally, a mineral filler (D) such as clay can be included.

While most any of the above-mentioned aliphatic and/or cycloaliphatic diols and aromatic dicarboxylic acids or ester derivatives thereof may be used in the preparation of the thermoplastic aromatic polyester (B), preferred polyester will have repeating units of the following general formula:

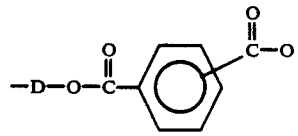

where D is the divalent radical remaining after removal of the hydroxy groups from a low molecular weight diol, as defined above. Additionally, these polyesters may also contain minor amounts of other units such as aliphatic dicarboxylic acids and/or aliphatic polyols. Preferred polyesters include poly(butylene terephthalate), poly(ethylene terephthalate) and blends thereof, most preferably poly(butylene terephthalate).

The polyesters described above are either commercially available or can be produced by methods well known in the art, such as those set forth in U.S. Pat. Nos. 2,465,319; 3,047,539 and 2,910,466.

The rubbery, multistage interpolymer modifier is comprised of a crosslinked acrylate rubbery phase and an interpenetrating crosslinked styrenic resin phase. The two phases, produced in sequential fashion, maintain integrity as a result of the crosslinking of the interpenetrating polymer chains. As a consequence, it is not necessary to graft the second phase onto the first although such a grafting step could be utilized if desired. The exact structure of the multistage interpolymer is not known but a reasonable conjecture maintains that a core of crosslinked acrylate rubber is formed in the first step which is then surrounded and interpenetrated by styrenic resin, which is crosslinked thereby forming the integral multistage interpolymer. Whether this crosslinked styrenic phase forms a complete or discontinuous "shell" around the core depends on reaction conditions as well as quantities of polymer utilized.

The multistage, interpolymer modifiers (C) of the present invention are those having a crosslinked (meth) acrylate rubbery phase, preferably butyl acrylate. Associated with this crosslinked rubbery phase is a phase comprised of crosslinked styrenic resin, preferably styrene, which interpenetrates the crosslinked rubbery phase. Incorporation of small amounts of other monomers such as acrylonitrile or (meth)acrylonitrile within the resin also provides products within the scope of this invention. The interpenetrating network is provided when the monomers forming the resin phase are polymerized and crosslinked in the presence of the previously polymerized and crosslinked (meth)acrylate rubbery phase.

The interpolymer compositions may be formed by the following two-step, sequential polymerization process:

1. emulsion polymerizing an acrylate monomer charge of at least one $C_2$–$C_{10}$ alkyl or alkoxyalkyl acrylate, $C_8$–$C_{12}$ alkyl or alkoxyalkyl methacrylate, or compatible mixtures thereof (all of which may be referred to as (meth) acrylate), in an aqueous polymeriization medium in the presence of an effective amount of a suitable di or polyfunctional ethyleneically unsaturated crosslinking agent for such type of monomer, with the $C_4$–$C_8$ alkyl or alkoxyalkyl acrylates being the preferred acrylate monomers for use in this step;

2. emulsion polymerizing a monomer charge of styrene or styrene/(meth)acrylonitrile in an aqueous polymerization medium, also in the presence of an effective amount of a suitable di or polyfunctional ethyleneically unsaturated crosslinking agent for such monomers, said polymerization being carried out in the presence of the product from Step 1 so that the crosslinked (meth)acrylate and crosslinked vinyl aromatic, e.g., styrene or styrene/(meth)acrylonitrile components from an interpolymer wherein the respective phases interpenetrate one another.

The final multistage rubbery product that is formed thereby can be isolated and dried.

In greater detail, in conducting the aqueous emulsion polymerization step leading to the preparation of the crosslinked (meth)acrylate rubbery phase, there is preferably first prepared a monomer charge comprising an aqueous mixture containing about 10 to 50 percent by weight, of one or more monomers, the identity of which will be described in detail hereinbelow and from about 0.2 to 2.0 percent weight of the monomer mixture, of a water-soluble catalyst, such as ammonium, sodium or potassium persulfate, hydrogen peroxide or a redox system, such as a mixture of a persulfate with an alkali metal bisulfite, thiosulfite or hydrosulfite. The mixture is then heated at a temperature of from about 40 degrees to 95 degrees C. for a period of about 0.5 to about 8 hours.

The (meth)acrylic elastomer phase comprises crosslinked (meth)acrylic polymers or copolymers having a Tg, i.e., a glass transition temperature, of less than about 25 degrees C. These can be polymerized by means of free radical initiated emulsion techniques. These (meth) acrylic elastomer polymers should be crosslinked so that they can retain their integrity during subsequent polymer processing steps. This crosslinking can be achieved during the polymerization of the elastomer if a polyfunctional ethyleneically unsaturated monomer is included in the polymerization recipe. As used in this disclosure, the term "crosslinked" denotes a polymer which at ambient temperatures is substantially insoluble in such organic solvents as tetrahydrofuran or cyclohexanone.

Examples of (meth)acrylic elastomers that can be used include the crosslinked polymers of the $C_2$–$C_{10}$ alkyl acrylate and the $C_8$–$C_{12}$ alkyl methacrylate monomers, preferably the $C_2$–$C_8$ alkyl acrylates, such as poly(n-butyl acrylate), poly(ethyl acrylate) and poly(2-ethylhexylacrylate). At least one acrylate monomer is utilized in this step. If desired, the monomer charge may contain small amounts, i.e., 1 to 20 percent by weight of the amount of acrylate monomer, of optional monomers including styrene, acrylonitrile, methacrylonitrile, methyl methacrylate, methacrylic acid, acrylic acid, vinylidene chloride, vinyl toluene and any other ethyleneically unsaturated monomer copolymerizable with the acrylate monomer selected for use. Special mention is made of alkoxyalkyl (meth)acrylates, specifically ethoxyethyl and methoxymethyl (meth)acrylates, and acrylonitrile which will improve oil resistance while maintaining a low Tg.

In order to crosslink the (meth)acrylate monomer, from about 0.05 to about 10, preferably 0.1 to 5 percent by weight based on the weight of acrylate monomer, of at least one crosslinking agent is used. This crosslinking agent is for the purposes of this invention a di or polyfunctional ethylenically unsaturated monomer having at least one vinyl group of the formula:

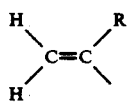

wherein R is hydrogen or lower alkyl. As is well known in the art the vinyl groups on the crosslinking monomer can be the same, e.g., divinyl benzene, trimethylolpropane triacrylate, etc., or different, e.g. allyl methacrylate, diallyl fumarate, diallyl maleate, etc. Examples of other suitable crosslinking monomers which are known to persons in the art and which can be used are triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, diethylene glycol diacrylate, diethylene glycol dimethacrylate, 1,6-hexanediol diacrylate, 2,2-dimethylpropane 1,3-diacrylate, triallyl isocyanurate, divinyl benzene, pentaerythritol tetramethacrylate, dipentaerythritol monohydroxy-pentaacrylate, pentaerythritol triacrylate, ethoxylated trimethylolpropane triacrylate, polyethylene glycol diacrylate, tetraethylene glycol diarylate, pentaerythritol tetraacrylate, 1,3-butylene glycol dimethacrylate, tripropylene glycol diacrylate, ethoxylated bisphenol A dimethyacrylate, ethoxylated bisphenol-A diacrylate, trimethylolpropane triacrylate, trimethylolpropane trimethacrylate, mixtures of any of the foregoing, and the like.

Optimum results are obtained by the use of a crosslinked copolymer containing from about 95 to 99.9 percent by weight of n-butyl acrylate and from about 0.1 to about 5 percent by weight, of butylene glycol diacrylate.

The emulsifier which is used is at least one of the following conventional types: an anionic emulsifier, e.g., the $C_2$–$C_{22}$ carboxylic acids, the sulfates or, sulfonates of $C_6$–$C_{22}$ alcohols or allyl phenols; a non-ionic emulsifier, e.g., the addition products of alkylene oxides to fatty acids, amines or amides; a combination of the foregoing anionic and non-ionic emulsifiers; or the cationic emulsifiers, e.g., a quarternary ammonium containing compound. The amount of emulsifier should be present from about 0.5 to about 5 percent by weight in the emulsion.

In the prior disclosure of Yu et al., U.S. No. 3,944,631, it has been found that regardless of the particular emulsifier being utilized in preparing the rubber polymer latex, its polymerization in large scale commercial equipment is greatly facilitated by introducing the monomer charge to the system in several portions over a period of from 1 to 3 hours. Thus, where this is not done and the total monomer charge is introduced in one portion, the resulting exothermic polymerization reaction often becomes virtually presence of minor portion of at least one difunctional may set up, i.e., coagulate, the resulting polymer latex. However, by dividing the monomer charge and introducing it in about several portions, the resulting polymerization reaction remains controllable and overheating and coagulation can be prevented. An initiator is also present in the emulsion in an amount ranging from about 0.0005 to 2 percent by weight of the (meth)acrylate monomer. Suitable for use are water soluble peroxidic compounds, e.g., hydrogen peroxide and alkali metal and ammonium persulfates, oil soluble organic peroxides and azo compounds, e.g., benzoylperoxide, azobisisobutyronitrile and the like, used singly or in combination. Redox catalysts, e.g., mixtures of peroxidic catalysts with reducing agents, such as hydrazine, alkali metal bisulfites, thiosulfates, and hydrosulfites, and soluble oxidizable sulfoxyl compounds can also be used. Preferred as the initiator herein is ammonium persulfate.

A chain transfer agent as an alkyl mercaptan, e.g., t-dodecyl mercaptan, toluene, xylene, chloroform, halogenated hydrocarbons and the like may also be used. A buffer to adjust the pH may be used.

The next step in the preferred embodiment of preparing the interpolymers used herein is the emulsion polymerization of a mixture of vinyl aromatic monomers, e.g., styrene or styrene and acrylonitrile, in the presence of minor portion of at least one difunctional or polyfunctional crosslinking monomer to form, for example, a crosslinked styrene homopolymer or styrene-acrylonitrile co-polymer. This emulsion polymerization is carried out in the presence of the crosslinked (meth)acrylate rubbery phase by adding the styrene or styrene-acrylonitrile charge to the previously prepared aqueous emulsion of crosslinked (meth)acrylate rubbery phase. The amount of styrene or styrene-acrylonitrile which is added ranges from about 60 to about 10, preferably from about 50 to about 20 percent based upon the weight of the final product which will be formed. When present, (meth)acrylonitrile preferably comprises from about 15 to about 45 parts by weight to, correspondingly, about 85 to about 55 parts of vinyl aromatic monomer.

The monomer charge of styrene-acrylonitrile, when such a combination is used, can comprise from about 55:45 to about 85:15 weight parts of styrene to acrylonitrile with the most preferred ratio being about 76:24. If desired, minor amounts, e.g., below about 20 percent by weight, of optional monomers can be included. Examples are t-butyl styrene, p-chlorostyrene, alpha-methylstyrene, methyl methacrylate, alkyl acrylate vinylidene chloride, ethylene, propylene, isobutylene and other ethyleneically compounds copolymerizable with styrene and styrene-acrylonitrile.

The crosslinking agent, emulsifiers, initiators, and chain transfer agents discussed in the previous step can also be used in this step in the same amounts to form the interpenetrating crosslinked styreneacrylonitrile resin phase associated with the rubbery phase.

POLYMERS C1 AND C2

Polymer C1: Preparation of XL Acrylate/XL Styrene Interpolymer

A thermoplastic elastomer comprising a crosslinked poly(butyl acrylate) and an interpenetrating, crosslinked polystyrene resin phase is prepared in a five liter, three-necked flask equipped with a heating/cooling jacket, a Teflon blade agitator, a thermometer, and a nitrogen purge.

The following solutions are prepared:

| Solution A: | n-butyl acrylate | 751.4 g |
| | 1,3-butyleneglycol diacrylate | 1.27 g |
| Solution B: | sodium metabisulfite | 1.75 g |
| | deionized water | 27.4 g |
| Solution C: | ammonium persulfate | 4.84 g |
| | deionized water | 76.1 g |
| Solution D: | styrene | 250.6 g |
| | divinyl benzene | 2.65 g |

(55% active solution Dow Chemical)

Into the reaction flask is charged: 3,460 g deionized water, the following emulsifying agents: 2.1 g Sipex UB sodium lauryl sulfate (from Alcolac, Inc.) and 4.2 g Aerosol A-268, a disodium sulfosuccinate (from American Cyanamid), and 14.6 g of Solution B. The flask is stirred and sparged with $N_2$ room temperature for 30 minutes, to reduce the $O_2$ content.

Thereafter, 150.5 g of $N_2$ sparged Solution A is added. The flask contents are heated to 55 degrees C. and then 13.5 g solution C is added to initiate polymerization.

After 1.5 hours of reaction, a sample shows 4.1% resin solids indicating approximately 96% percent conversion. The remainder of Solution A as well as 14.6 g Solution B and 40.4 g solution C are added. After 2.5 hours of additional reaction time at 55 degrees C., a sample shows 17.2 percent resin solids, indicating greater than 97 percent conversion.

The reaction mixture is cooled to 35 degrees C. and Solution D is added mixed for 15 minutes at 35 degrees C. The reaction mixture is then heated to 60 degrees C. and the remainder of Solution C is added. The mixture was reacted for 1.25 hours. The temperature is raised to 75 degrees C. and maintained for 45 minutes. A final sample shows 22.4 percent resin solids indicating a conversion greater than 98 percent.

The product latex is coagulated in a solution of 0.25 weight percent $CaCl_2$ in methanol at a rate of 1600 ml methanol per 800 ml latex. The coagulum is filtered, rinsed with fresh water, and dried in a vacuum oven at 60 degrees C.

The product has a rubber content of 75% by weight, a number average latex particle diameter of 211 nanometers, a swell index in methyl ethyl ketone (MEK) of 8.1 and a percent gel fraction from MEK extraction of 91.1 percent.

POLYMER C2: PREPARATION OF XL ACRYLATE/XL STYRENE-ACRYLONITRILE INTERPOLYMER

A thermoplastic elastomer comprising a cross-linked poly(butyl acrylate) rubbery phase and a cross-linked poly(styrene-co-acrylonitrile) resin phase is prepared according to the method of the previous preparation except that 30 weight percent of the styrene is replaced with acrylonitrile and 70 weight percent styrene monomers are used in Solution D.

While compositions of this invention possess many desirable properties, it is sometimes advisable and preferred to further stabilize certain of the compositions against thermal or oxidative degradation as well as degradation due to ultraviolet light. This can be done by incorporating stabilizers into the blend compositions. Satisfactory stabilizers comprise phenols and their derivatives, amines and their derivatives, compounds containing both hydroxyl and amine groups, hydroxyazines, oximes, polymeric, phenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxyethyl-s-triazine-2,4,6-(1H, 3H, 5H)trione; 4,4'-bis(2,6-ditertiary butylphenyl); 1,3,5-trimethyl-2,4,6-tris(3,5-ditertiarybutyl-4-hydroxylbenzyl)benzene and 4,4'-butylidene-bis (6-tertiarybutyl-m-cresol). Various inorganic metal salts or hydroxides can be used as well as organic complexes such as nickel dibutyl dithiocarbamate, manganous salicylate and copper 3-phenyl-salicylate. Typically amine stabilizers include N,N'-bis(beta-naphthyl)-p-phenylenediamine; N,N'-bis(methylheptyl)-p-phenylenediamine and either phenyl-beta-napthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

Optionally, a mineral filler (D), preferably, selected from the group consisting of clay and syenite may be added.

The syenites are inorganic feldspathic minerals which are widely known and commerically available. A preferred syenite is the nepheline syenite which is an anhydrous sodium potassium aluminum silicate. One particular source for such mineral fillers is Indusmin Ltd. under the trademark MINEX.

The preferred class of mineral fillers are the clays. Clays are well known and widely available commercially. Preferred clays are the crystalline and paracryacrystalline clays. Especially preferred are the crystalline clays, most preferably the Kaolin clays. The clays, particularly the Kaolin clays, may be in the hydrous form or in the calcined, anhydrous form. Exemplary of commercially available, suitable clays there may be given the clays available under the trademark Whitex and Translink from Freeport Kaolin.

Additionally, it is preferred, although not required, to utilize mineral fillers which have been treated with a titanate or silane coupling agent. Exemplary of such coupling agents there may be given vinyl tris 2-methoxy ethoxy silane and gamma-aminopropyl triethyoxy silane (A-1100 Union Carbide).

The compositions of the present invention may be prepared by any of the well known techniques for preparing polymer blends or admixtures, with extrusion blending being preferred. Suitable devices for the blending include single screw extruders, twin screw extruders, internal mixers such as the Banbury Mixer, heated rubber mill (electric or oil heat) or Farrell continuous mixers. Injection molding equipment can also be used to accomplish blending just prior to molding, but care must be taken to provide sufficient time and agitation to insure uniform blending prior to molding.

Alternative methods include dry blending prior to extrusion or injection molding as well as precompounding of two ingredients, particularly the thermoplastic polyester (B) and the interpolymer modifier (C) and optionally filler (D) prior to mixing with the thermoplastic elastomer (A).

The polymer compositions prepared in accordance with the present invention are suitable for a broad range of molding applications.

DETAILED DESCRIPTION OF THE PREFERRED EMBODIMENTS

The following examples show preferred embodiment of the compositions and processes of the claimed invention and the products formed therefrom. They are illustrative and are not intended to limit the claims in any way whatsoever.

The following copolyetherester was used in exemplifying the present invention:

Polymer A-1 is a random copolyetherester derived from 25 parts of butanediol, 48 parts of dimethyl terephthalate, 14 parts hexanediol and 13 parts poly(tetramethylene ether)glycol (MW 2000). Polymer A-2 is a (random) copolyetherester derived from 22 parts of butanediol, 12 parts of hexanediol, 42 parts of dimethylterephthalate and 24 parts of poly(tetramethylene ether)glycol (MW 2000).

The following polyester was used in exemplifying the present invention:

Polymer B is available from General Electric as Valox® 295, poly(1,4-butylene terephthalate).

The following interpolymers were used in exemplifying the present invention:

Polymer C1 is made as described above
Polymer C2 is made as described above.

Clay is obtained from Englehard under product designation Translink 555.

EXAMPLES 1-3

Compositions are prepared by combining a polyetherester copolymer as described above, an aromatic thermoplastic polyester, as described above, and a multistage interpolymer identified as XL acrylate/XL styrene, prepared as described above. The interpolymer is a crosslinked butyl acrylate which is interpenetrated by a crosslinked polystyrene, as prepared above. Clay is included in two of the compositions.

The compositions are prepared by melt blending, in an extruder and injection molding in a single gated mold. Workpieces are tested for tensile and elongation properties by ASTM procedure 638. The formulations used and the results obtained are set forth in the Table 1 as follows:

TABLE 2

Compositions Comprising Polyetherester Copolymers, Polybuytlene Terephthalate, and (Meth)Acrylate Cross-Linked Styrenic Interpolymer

| Examples | 4 | 5 | 6 | 7 | 8 | 9 | 10 |
|---|---|---|---|---|---|---|---|
| Compositions (parts by weight) | | | | | | | |
| Copolyetherester Elastomer[a] | 600 | 500 | — | 500 | — | 600 | 600 |
| Polyester Resin[b] | 100 | 100 | 100 | 900 | 100 | 100 | 100 |
| Rubbery Interpolymer[c] | 600 | 1000 | 1000 | 200 | 600 | 600 | 600 |
| Stabilizer[d] | 3 | 3 | 3 | 3 | 3 | 3 | 3 |
| Copolyetherester Elastomer[e] | — | — | 600 | — | — | — | — |
| Polymer[f] | — | — | — | — | 600 | — | — |
| Mineral Filler[g] | — | — | — | — | — | 150 | — |
| Mineral Filler[h] | — | — | — | — | — | — | 150 |
| Properties | | | | | | | |
| Type V Tensile Strength, psi 2"/min. | 1600 | 1200 | 2400 | 3900 | 2400 | 1250 | 1200 |
| Tensile Elongation, % | 465 | 395 | 570 | 385 | 520 | 225 | 170 |
| Flexmod, Kpsi | 10.0 | 8.0 | 18.0 | 141.0 | 17.0 | 11.0 | 16.6 |
| Durometer Shore D | 27.1 | 21.7 | 31.9 | 58.7 | 33.5 | 28.3 | 30.0 |

[a]Polymer A-2
[b]General Electric Valox ® 315, poly (1,4-butylene terephthalate), Polymer B
[c]XL-Acrylate/XL Styrene-Acrylonitrile, Polymer C-2
[d]Ciba Geigy IRGANOX ® 1076
[e]Dupont Hytrel ® 6335 G, a segmented copolyetherester derived from butanediol, dimethyl terephthalate and polytetramethylene ether glycol
[f]Polymer A-1
[g]Pfizer Talc MP4526
[h]Mica, Suzorite

EXAMPLES 4-10

The procedure of Examples 1-3 is repeated, modifying the formulations to use other resins and using talc and mica as fillers in some of them. The formulations used and the properties obtained are set forth in Table 2 as follows:

TABLE 1

Compositions Comprising Polyetherester Copolymers, Polybutylene Terephthalate, and (Meth)Acrylate Cross-Linked Styrenic Interpolymer

| Examples | 1 | 2 | 3 |
|---|---|---|---|
| Compositions (parts by weight) | | | |
| Polyetherester Copolymer[a] | 1030 | 1056 | 1004 |
| Polyester[b] | 500 | 514 | 486 |
| Interpolymer[c] | 400 | 400 | 400 |
| Clay | 40 | 0 | 80 |
| Properties | | | |
| Tensile Strength, psi | 2300 | 2300 | 2300 |
| Tensile Elongation, % | 390 | 400 | 290 |
| Flexural Modulus $\times 10^{-3}$ psi | 53 | 41 | 60 |

[a]Polymer A-2
[b]General Electric Valox ® 295, poly (1,4-butylene terephthalate)
[c]Interpolymer of Procedure C1.

The foregoing data demonstrate that compositions of copolyetheresters (Examples 1–3) retain good tensile properties (good elongation) coupled with low flexural modulus. It is unexpected that the compositions of this invention would have such good tensile elongations, ranging from 170 percent to greater than 400 percent. It is most unexpected that in view of their relatively high rubber content no delamination is seen showing unusually good compatibility.

With respect to Examples 4–10, the compositions again provide molded articles with good elongation coupled with desirably low modulus and unusually good compatibility, even when filled with mineral reinforcements.

The above-mentioned patents, applications and publications, if any are incorporated herein by reference.

Many variations will suggest themselves to those skilled in the art in light of the above, detailed description. All such variations are within the full intended scope of the appended claims.

I claim:

1. A thermoplastic elastomeric composition having improved softness and stiffness comprising:
   (A) at least one copolyetherester polymer comprising the reaction product of:
      (i) one or more diols;
      (ii) one or more dicarboxylic acids or an anhydride derivative thereof;
      (iii) one or more long chain ether glycols having a molecular weight of from about 400 to about 12000; and, optionally
      (iv) one or more lactones, wherein the long chain ether glycol and lactone, if any, comprise from about 5 to about 70 weight percent of the copolyetherester); and
   (B) at least one aromatic thermoplastic polyester consisting of repeating units of the following formula:

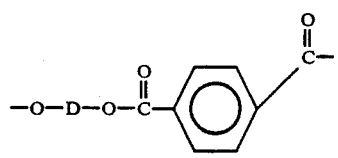

wherein D is the divalent radical remaining after removal of the terminal hydroxy groups of a $C_2$ to $C_{20}$ aliphatic or cycloaliphatic diol;

(C) a modulus reducing amount of a rubbery interpolymer consisting of a crosslinked (meth)acrylate rubbery phase and an interpenetrating, essentially graft-free crosslinked styrenic resin phase wherein said rubbery interpolymer is prepared by polymerization of a styrene with a polyethylenically unsaturated cross-linking agent in the presence of the crosslinked (meth)acrylate rubbery phase, and, optionally
   (D) mineral filler.

2. A composition as defined in claim 1 wherein the copolyetherester elastomer is derived from:
   (i) one or more $C_2$ to $C_{20}$ aliphatic or cycloaliphatic diols;
   (ii) one or more $C_4$ to $C_{36}$ dicarboxylic acids or ester or anhydride derivative thereof;
   (iii) one or more poly(alkylene ether)glycols having a molecular weight of from about 900 to about 4000; and, optionally,
   (iv) one or more lactones, wherein:
      (a) at least 60 mole percent of the diols are the same;
      (b) at least 60 mole percent of the dicarboxylic acids are the same; and
      (c) the combined amount of long chain ether glycol and lactone, if any, in the copolyether-ester is from about 10 to about 50 weight percent.

3. A composition as defined in claim 2 wherein at least about 80 mole percent of the diols and at least about 80 mole percent of the dicarboxylic acids are the same.

4. A composition as defined in claim 2 wherein the predominant dicarboxylic ester derivative is dimethyl-terephthalate.

5. A composition as defined in claim 2 wherein component (ii) is selected from the group consisting of hexahydrophthalic anhydride, $C_{36}$ dimer acid and dimethylterephthalate.

6. A composition as defined in claim 2 wherein the poly(alkylene ether)glycol is selected from the group consisting of poly(ethylene ether)glycol, poly(propylene ether)glycol, poly(tetramethylene ether)glycol and copoly(propylene ether-ethylene ether)glycol.

7. A composition as defined in claim 6 wherein the poly(alkylene ether)glycol is poly(tetramethylene ether)glycol.

8. A composition as defined in claim 1 wherein the copolyetherester contains a lactone in an amount of from about 2 to about 50 percent by weight.

9. A composition as defined in claim 8 wherein the copolyetherester contains a lactone in an amount of from about 10 to about 30 percent by weight.

10. A composition as defined in claim 8 wherein the lactone is epsilon caprolactone.

11. A composition as defined in claim 9 wherein the lactone is epsilon caprolactone.

12. A composition as defined in claim 1 wherein the aromatic thermoplastic polyester is represented by repeating units of the following formula:

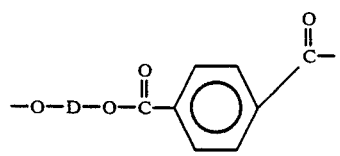

wherein D is the divalent radical remaining after removal of the terminal hydroxy groups of $C_2$ to $C_6$ aliphatic diol.

13. A composition as defined in claim 12 wherein the aromatic thermoplastic polyester is selected from the group consisting of poly(ethylene terephthalate), poly(butylene terephthalate), copoly(butyleneterephthalate-isophthalate) and mixtures thereof.

14. A composition as defined in claim 13 wherein the aromatic thermoplastic polyester is poly(butylene terephthalate).

15. A composition as defined in claim 1 wherein the rubbery phase of said crosslinked (meth)acrylate comprises a crosslinked alkyl or alkoxyalkyl (meth)acrylate.

16. A composition as defined in claim 15 wherein said (meth)acrylate comprises butyl acrylate.

17. A composition as defined in claim 1 wherein said crosslinked styrenic resin is crosslinked polystyrene.

18. A composition as defined in claim 1 wherein said crosslinked styrenic resin is crosslinked styrene-acrylonitrile copolymer.

19. A composition as defined in claim 1 wherein the copolyetherester (A) is present in an amount of from about 1 to about 99 parts by weight to, correspondingly, from about 99 to about 1 parts by weight of aromatic polyester (B) and the rubbery interpolymer (C) is present in an amount of from about 5 to 95 parts by weight to, correspondingly from about 95 to 5 parts of (A) and (B) taken together and mineral filler (D) is present in an amount of from 0 to 40 parts by weight per 100 parts by weight of (A), (B) and (C), taken together.

20. A composition as defined in claim 19 comprising from about 20 to 80 parts by weight of copolyetherester elastomer (A) to from about 80 to 20 parts by weight aromatic polyester (B), and from about 20 to about 80 parts by weight of rubbery interpolymer (C) based on about 80 to about 20 parts by weight of (A) and (B) taken together, and from about 0 to about 20 parts by weight of mineral filler (D).

21. An article comprising a thermoplastic elastomeric composition as defined in claim 1.

* * * * *